US011937261B2

(12) United States Patent
Lee

(10) Patent No.: US 11,937,261 B2
(45) Date of Patent: Mar. 19, 2024

(54) METHOD AND SYSTEM FOR DYNAMICALLY SWITCHING TRANSMISSION MODES TO INCREASE RELIABILITY IN UNLICENSED CONTROLLED ENVIRONMENTS

(71) Applicant: INSTITUTE FOR INFORMATION INDUSTRY, Taipei (TW)

(72) Inventor: Kun-Hung Lee, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 337 days.

(21) Appl. No.: 17/535,819

(22) Filed: Nov. 26, 2021

(65) Prior Publication Data
US 2023/0145818 A1 May 11, 2023

(30) Foreign Application Priority Data
Nov. 10, 2021 (TW) .................................. 110141737

(51) Int. Cl.
*H04W 72/23* (2023.01)
*H04W 16/14* (2009.01)

(52) U.S. Cl.
CPC ........... *H04W 72/23* (2023.01); *H04W 16/14* (2013.01)

(58) Field of Classification Search
CPC .............................. H04W 72/23; H04W 16/14

USPC .......................................................... 370/329
See application file for complete search history.

(56) References Cited

U.S. PATENT DOCUMENTS

| 2020/0351030 | A1* | 11/2020 | Deogun | ............ | H04W 74/0808 |
| 2020/0351031 | A1* | 11/2020 | Wu | ........................ | H04L 1/1883 |
| 2021/0105812 | A1* | 4/2021 | Rastegardoost | .......... | H04L 1/08 |
| 2022/0393794 | A1* | 12/2022 | Wang | .................... | H04W 72/23 |

* cited by examiner

*Primary Examiner* — Nicholas R Taylor
*Assistant Examiner* — Chong G Kim
(74) *Attorney, Agent, or Firm* — Birch, Stewart, Kolasch & Birch, LLP

(57) ABSTRACT

The present disclosure is a method and a system for dynamically switching transmission modes to increase reliability in unlicensed controlled environments (UCEs). The system includes a user equipment (UE) to execute the method. When a next generation Node B (gNB) cannot successfully receive or decode data transmitted by the UE, the UE will receive a dynamic grant (DG) signal transmitted by the gNB. When the UE can receive the DG signal, the UE will start a configured grant (CG) timer and count a CG counter, and the UE will calculate a CG weight. The UE determines communication quality between the UE and the gNB according to the CG weight. When the CG weight is greater than a CG threshold, the UE determines communication quality is bad, and switches to a CG transmission mode to increase reliability for transmitting the data. Therefore, spectrum usage efficiency in the UCEs can be improved.

10 Claims, 3 Drawing Sheets

METHOD AND SYSTEM FOR DYNAMICALLY SWITCHING TRANSMISSION MODES TO INCREASE RELIABILITY IN UNLICENSED CONTROLLED ENVIRONMENTS

CROSS-REFERENCE TO RELATED APPLICATION(S)

This application claims the priority benefit of TW application serial No. 110141737 filed on Nov. 10, 2021, the entirety of which is hereby incorporated by reference herein and made a part of the specification.

BACKGROUND

1. Field of the Disclosure

The present disclosure relates to a method and a system for switching transmission modes, in particular to a method and a system for dynamically switching transmission modes to increase reliability in unlicensed spectrum control environments (UCEs).

2. Description of the Prior Arts

In the fifth generation (5G) communication technology standard specifications, there are at least two transmission modes for a user equipment (UE) to transmit uplink radio signals to a next generation Node B (gNB). One of the transmission modes is the ultra-reliable and low latency communications configured grant mode (URLLC CG mode), and the other one of the transmission modes is the new radio unlicensed configured grant mode (NR-U CG mode).

URLLC CG mode is used in the licensed spectrum to solve the latency problem when the communication quality of the radio channel is good. The NR-U CG mode is used in the unlicensed spectrum to solve the reliability problem when the communication quality of the radio channel is bad.

However, the communication quality of the radio channel is constantly changing in unlicensed controlled environments (UCEs). For example, unpredictable noise interference often decreases the communication quality of the radio channel. When there is no noise interference, the radio channel can maintain good communication quality. Therefore, if only a single transmission mode is used, it is easy to cause excessive latency or poor transmission reliability.

For example, if the UE transmits uplink radio signals to the gNB by the URLLC CG mode and the communication quality of the radio channel becomes bad with noise interference, the URLLC CG mode can decrease the latency, but it can also reduce the reliability.

Therefore, the existing transmission method for the UE to transmit the uplink radio signals to the gNB still needs to be further improved.

SUMMARY

In view of the above problems, the present disclosure provides a method and a system for dynamically switching transmission modes to increase reliability in unlicensed spectrum control environments (UCEs). In environments where the communication quality of the radio channel may change, a user equipment (UE) automatically and dynamically switches the transmission modes of transmitting uplink radio signals to a next generation Node B (gNB) based on the communication quality of the radio channel, thereby improving spectrum usage efficiency in the UCEs.

The system for dynamically switching transmission modes in UCEs includes a UE, and the UE executes the method for dynamically switching transmission modes in UCEs. When the UE executes the method, the UE performs a first configured grant (CG) transmission mode, and the UE executes steps of: transmitting a new data to a gNB; determining whether a dynamic grant (DG) signal transmitted by the gNB is received; when the DG signal is received, starting a CG timer, increasing a count value of a CG counter, resetting a successful transmission count value of a successful transmission counter, calculating a CG weight according to a timing value of the CG timer and the count value, and determining whether the CG weight is greater than or equal to a CG threshold; when the CG weight is greater than or equal to the CG threshold, switching from a first CG transmission mode to a second CG transmission mode; when the CG weight is smaller than the CG threshold, transmitting a retransmission data to the gNB.

The CG weight is calculated by the following formula:

$$W_1 = a1 \times \text{timer1} + b1 \times \text{counter1};$$

$$\text{timer1} = \text{timer\_current}/\text{timer\_max};$$

$$\text{counter1} = \text{counter\_current}/\text{counter\_max};$$

$W_1$ is the CG weight, a1 is a time weight, b1 is a count weight, timer_current is the timing value, timer_max is a preset maximum of waiting time, counter_current is the count value, counter_max is a maximum number of preset allowable failures, and a1+b1=1.

The CG threshold is calculated by the following formula:

$$TH_1 = \text{MAX}[a1, b1];$$

$TH_1$ is the CG threshold.

When the gNB receives a data from the UE, the gNB decodes the data. When the gNB cannot successfully decode the data, the gNB generates the DG signal and sends the DG signal to the UE. Therefore, when the UE receives the DG signal, it means that the gNB cannot successfully decode the data. That is, the UE does not successfully transmit the data to the gNB. At this time, the UE starts the CG timer and increases the count value of the CG counter. The UE further determines whether the CG weight is greater than or equal to the CG threshold. When the CG weight is greater than or equal to the CG threshold, it means that the UE fails to transmit data to the gNB many times. Therefore, the communication quality of the current radio channel is determined to be bad, which causes the UE to fail to send data to the gNB many times. Therefore, the UE switches to the second CG transmission mode, thereby improving the reliability of data transmission by the second CG transmission mode.

For example, the second CG transmission mode may be an NR-U CG mode used in an unlicensed spectrum. Therefore, when the communication quality is bad, the reliability of data transmission can be improved by the second CG transmission mode.

In addition, since the UE calculates the CG weight according to the timing value of the CG timer and the count value of the CG counter, the CG weight can be dynamically adjusted with time or a number of failures of transmission. In other words, the present disclosure dynamically adjusts weights of a counter and of a timer to achieve the benefit of automatically adjusting and switching the CG transmission mode according to environmental changes.

In summary, the present disclosure can dynamically and automatically switch the current CG transmission mode based on the communication quality of the radio channel. When the communication quality of the radio channel is bad, the UE switches to the second CG transmission mode. In this way, when the communication quality is bad, the second CG transmission mode can be used to improve the reliability, thereby improving spectrum usage efficiency in UCEs.

DETAILED DESCRIPTION

Figure 1:
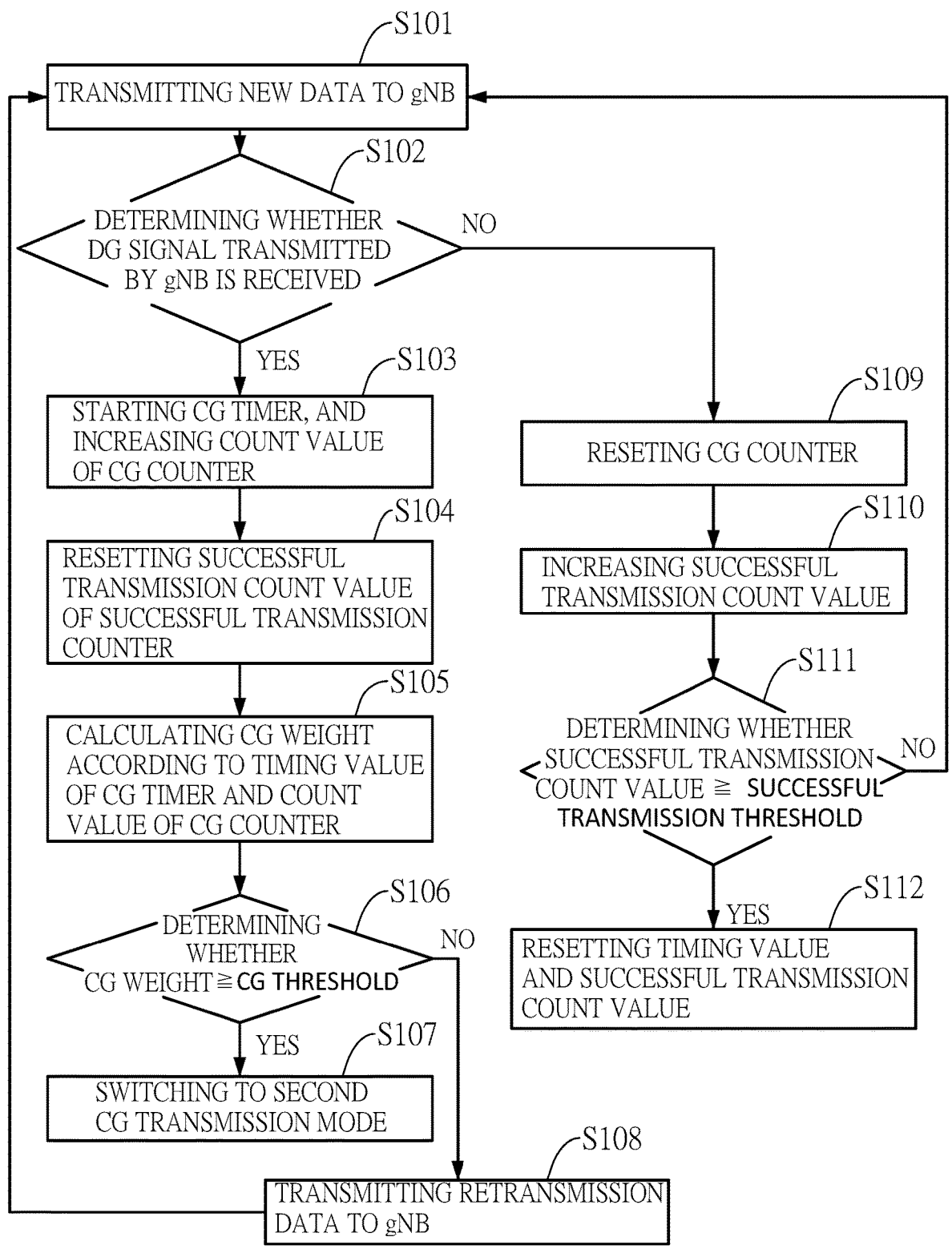
FIG. 1 is a schematic flowchart of a method for dynamically switching transmission modes to increase reliability in unlicensed spectrum control environments (UCEs) of the present disclosure.
Figure 2:
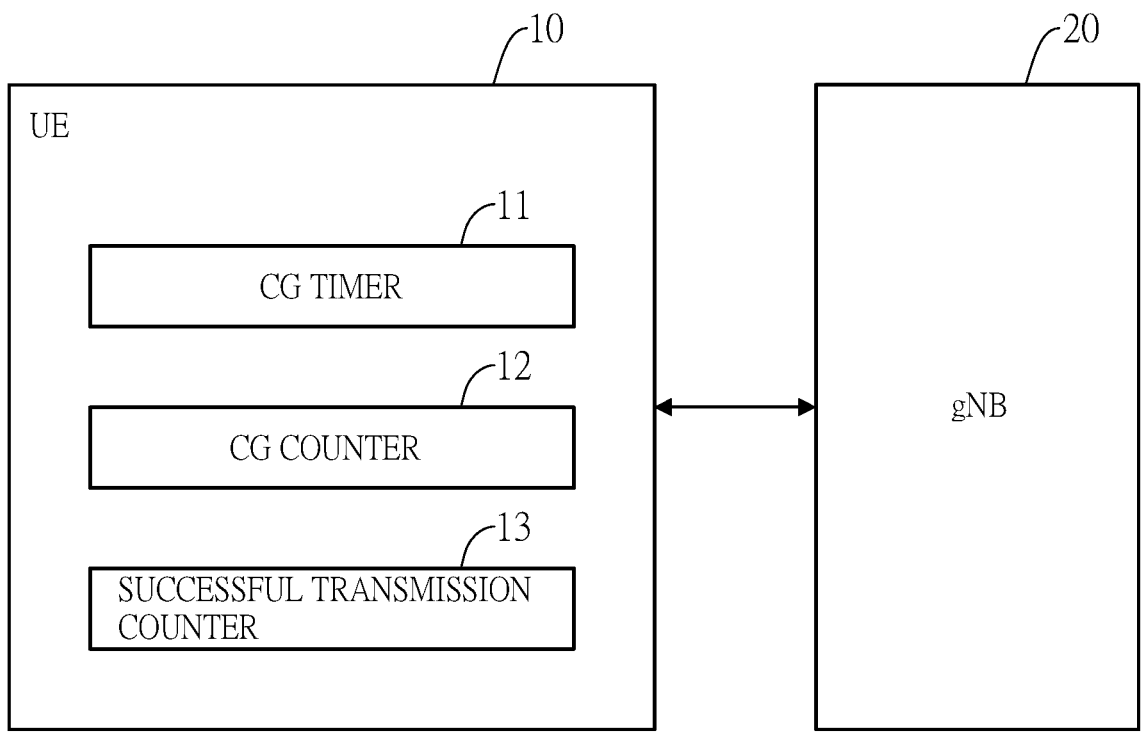
FIG. 2 is a schematic block diagram of a system for dynamically switching transmission modes to increase reliability in UCEs of the present disclosure.

Referring to FIG. 1 and FIG. 2, a method for dynamically switching transmission modes to increase reliability in unlicensed spectrum control environments (UCEs) shown in FIG. 1 is executed by a user equipment (UE) 10 shown in FIG. 2. Please refer to FIG. 1 and FIG. 2 for the following description.

The method for dynamically switching transmission modes in UCEs is executed by the UE performing a first configured grant (CG) transmission mode, and includes step S101 to step S112.

In step S101, the UE 10 transmits a new data to a next generation Node B (gNB) 20. For example, the new data may be uplink data. In the fifth generation (5G) communication technology standard specifications, the data transmitted by the UE 10 to the gNB 20 is uplink data, and the data transmitted by the gNB 20 to the user equipment 10 is downlink data.

In step S102, the UE 10 determines whether a dynamic grant (DG) signal transmitted by the gNB 20 is received. When the gNB 20 fails to receive the data, the gNB 20 generates a DG signal and sends the DG signal to the UE 10. Therefore, when the UE 10 receives the DG signal, it means that the gNB 20 fails to receive the data, that is, the UE 10 fails to transmit the data, such as the Listen-Before-Talk failure (LBT failure). In other words, the UE 10 can determine whether the gNB 20 successfully receives and decodes the data transmitted by the UE 10 according to whether the DG signal is received from the gNB 20.

In step S103, when the DG signal is received, the UE 10 starts a CG timer 11 and increases a count value of a CG counter 12. For example, the UE 10 starts the CG timer 11 to time a timing value of the CG timer 11 and increases the count value of the CG counter 12 by one. In the embodiment, when the UE 10 receives the DG signal at the first time, the UE 10 starts the CG timer 11 and increases the count value of the CG counter 12 by one from zero. When the UE 10 receives the DG signal at the first time, since the CG timer 11 has been started, the UE 10 does not need to start the CG timer 11, and the UE 10 just needs to increase the count value of the CG counter 12 by one.

In step S104, the UE 10 resets a successful transmission count value of a successful transmission counter 13. When the UE 10 receives the DG signal, the UE 10 can determine that the new data is failure transmission. Therefore, the UE 10 needs to reset the successful transmission count value of the successful transmission counter 13. Namely, the successful transmission count value means a number of continuously successful transmissions of data transmitted from the UE 10 to the gNB 20.

In step S105, the UE 10 calculates a CG weight according to the timing value of the CG timer 11 and the count value of the CG counter 12, and the CG weight is calculated by the following formula:

$W_1 = a1 \times \text{timer1} + b1 \times \text{counter1};$ $\text{timer1} = \text{timer\_current}/\text{timer\_max};$ $\text{counter1} = \text{counter\_current}/\text{counter\_max};$ $W_1$ is the CG weight, a1 is a time weight, b1 is a count weight, timer_current is the timing value, timer_max is a preset maximum of waiting time, counter_current is the count value, counter_max is a maximum number of preset allowable failures, and a1+b1=1. For example, the preset maximum of waiting time timer_max is a maximum of the timing value of the CG timer 12, and the maximum number of preset allowable failures counter_max is a maximum of the count value of the CG counter 12. In this embodiment, the maximum of the timing value of the CG timer 12 is 200 milliseconds (ms), and the maximum of the count value of the CG counter 12 is 10.

In step S106, the UE 10 further determines whether the CG weight is greater than or equal to a CG threshold.

The CG threshold is calculated by the following formula:

$TH_1 = \text{MAX}[a1, b1];$ $TH_1$ is the CG threshold and equals to a maximum of the time weight a1 and the count weight b1. For example, if a1=0.7, b1=0.3, since a1>b1, $TH_1$=a1=0.7.

In step S107, when the CG weight is greater than or equal to the CG threshold, the UE 10 switches from the first CG transmission mode to a second CG transmission mode.

In step S108, when the CG weight is smaller than the CG threshold, the UE 10 transmits a retransmission data to the gNB, and further transmits a next new data to the gNB 20 (S101).

As the UE 10 has received the DG signal, when the UE 10 receives the DG signal, it means that the previously transmitted new data has not been received by the gNB 20. Therefore, the UE 10 needs to transmit the retransmission data to the gNB 20, thereby retransmitting the previously transmitted new data to the gNB 20. Then, the gNB 20 can receive and decode the retransmission data. When the UE 10 transmits the retransmission data, the UE 10 can directly transmit the next new data to the gNB 20.

In the embodiment, the first CG transmission mode between the UE 10 and the gNB 20 is the URLLC CG mode. After several steps in FIG. 1, in S107, the UE 10 is switched to the second CG transmission mode. Wherein the second CG transmission mode is the NR-U CG mode. Moreover, before the UE 10 executes the method for dynamically switching transmission modes to increase reliability in UCEs, the UE 10 initializes the CG timer 11, the CG counter 12, and the successful transmission counter 13.

In step S109, when the DG signal is not received, the UE 10 resets the CG counter. In step S110, the UE 10 increases the successful transmission count value.

In step S111, the UE 10 determines whether the successful transmission count value is greater than or equal to a successful transmission threshold. In step S112, when the successful transmission count value is greater than or equal to the successful transmission threshold, the UE 10 resets the timing value of the CG timer 11 and the successful transmission count value of the successful transmission counter 13, and then the UE 10 transmits a next new data to the gNB 20 (S101).

Further, when the successful transmission count value is smaller than the successful transmission threshold, the UE 10 directly transmits the next new data to the gNB (S101).

The CG counter 12 of the UE 10 can count a number of UE failed transmission, such as UE listen before talk failures (UE LBT failures), or a number of gNB failed reception. When the UE 10 fails to transmit the new data or the gNB 20 fails to receive the new data, the UE further determines the communication quality of radio channels according to the timing value of the CG timer 11. Namely, the UE 10 counts the number of the UE failed transmission or the number of the gNB failed reception within the preset maximum of waiting time (timer_max) according to the CG timer 11 and the CG counter 12.

For example, a1=0.7, b1=0.3, $TH_1$=0.7, timer_max 200 ms, counter_max=10. When the UE 10 receives the DG signal after transmitting a first new data to the gNB 20, it means that the gNB 20 does not successfully receive the first new data. Then, the UE 10 starts the CG timer 11 and increases the counter value of the CG counter 12 by one. Since the UE 10 receives the DG signal representing the UE transmitting failure, the UE 10 resets the successful transmission count value of the successful transmission counter 13 to be zero. Then, the UE 10 calculates the CG weight according to the timing value of the CG timer 11 and the count value of the CG counter 12.

Since the CG timer 11 is just started, the timing value is zero. The CG counter 12 also begins to count, and the count value is one after the count value is increased. The CG weight is calculated by the following formula:

$$W_1 = a1 \times timer1 + b1 \times counter1 = 0.7 \times 0/200 + 0.3 \times 1/10 = 0.03$$

Since 0.03<0.7, the CG weight is smaller than the CG threshold. Therefore, the UE 10 transmits retransmission data to the gNB 20, and then the UE 10 further transmits a second new data the gNB 20.

If the UE 10 does not receive the DG signal after the UE 10 transmits the second new data to the gNB 20, the UE 10 resets the count value of the CG counter 12 to be zero, and increases the successful transmission count value of the successful transmission counter 13 by one. Then the UE 10 determines whether the successful transmission count value is greater than or equal to the successful transmission threshold.

The successful transmission counter 13 is increased by one when the UE 10 does not receive the DG signal. When the UE 10 receives the DG signal, the UE 10 will reset the successful transmission count value of the successful transmission counter 13. Therefore, when the UE 10 continuously transmits multiple new data without receiving the DG signal, it means that the gNB 20 has successfully received the multiple new data continuously, and the successful transmission count value of the successful transmission counter 13 will be continuously accumulated. Namely, when the successful transmission count value of the successful transmission counter 13 is greater than the successful transmission threshold, it means that the gNB 20 has continuously and successfully received and decoded the multiple new data transmitted by the UE 10. Therefore, the UE 10 can determine the communication quality of the radio channels is good, the UE 10 does not need to switch to the second CG transmission mode, and the UE 10 needs to maintain the first CG transmission mode for maintaining low latency communications. The UE 10 further resets the CG timer 11 and the successful transmission counter 13 for avoiding switching to the second CG transmission mode.

However, if the UE 10 receives the DG signal after the UE 10 transmits the second new data to the gNB 20, the UE 10 further increases the count value of the CG counter 12 by one, and calculates the CG weight again. At this time, since the CG timer 11 has been started, the timing value of the CG timer 11 is not zero. For example, the timing value of the CG timer 11 is 10 ms, and the count value of the CG counter 12 is two. The CG weight is calculated by the following formula:

$$W_1 = a1 \times timer1 + b1 \times counter1 = 0.7 \times 10/200 + 0.3 \times 2/10 = 0.095$$

Since 0.095<0.7, the CG weight is still smaller than the CG threshold. Therefore, the UE 10 transmits retransmission data to the gNB 20, and then the UE 10 further transmits a third new data the gNB 20.

After a while, the UE 10 has not continuously and successfully received the multiple new data. The successful transmission count value of the successful transmission counter 13 is not greater than the successful transmission threshold, the timing value of the CG timer 11 would not be reset, and it means that the CG timer 11 does not stop timing. When the UE 10 receives the DG signal, the UE 10 calculates the CG weight again. For example, the timing value of the CG timer 11 is 180 ms, and the count value of the CG counter 12 is three. The CG weight is calculated by the following formula:

$$W_1 = a1 \times timer1 + b1 \times counter1 = 0.7 \times 180/200 + 0.3 \times 3/10 = 0.72$$

Since 0.72≥0.7, the CG weight is greater than the CG threshold. Therefore, the UE 10 switches to the second CG transmission mode.

Moreover, the multiple new data transmitted by the UE 10 may partially be received and decoded by the gNB 20. If times of the gNB 20 continuously and successfully receiving and decoding the multiple new data is not greater than the successful transmission threshold, the UE 10 resets the CG counter 12 but does not reset the CG timer 11. Even if the count value of the CG counter 12 is reset, the CG timer 11 does not stop timing. When the timing value of the CG timer 11 (timer_current) reaches the preset maximum of waiting time (timer_max), the CG weight is calculated by the following formula:

$$W_1 = a1 \times timer1 + b1 \times counter1 = 0.7 \times 200/200 + 0.3 \times 0/10 = 0.7$$

Since 0.7≥0.7, the CG weight is greater than the CG threshold. Therefore, the UE 10 switches to the second CG transmission mode. Namely, even if the count value of the CG counter 12 is reset, the UE 10 can switch to the second CG transmission mode when the timing value of the CG timer 11 reaches the preset maximum of waiting time.

Figure 3:
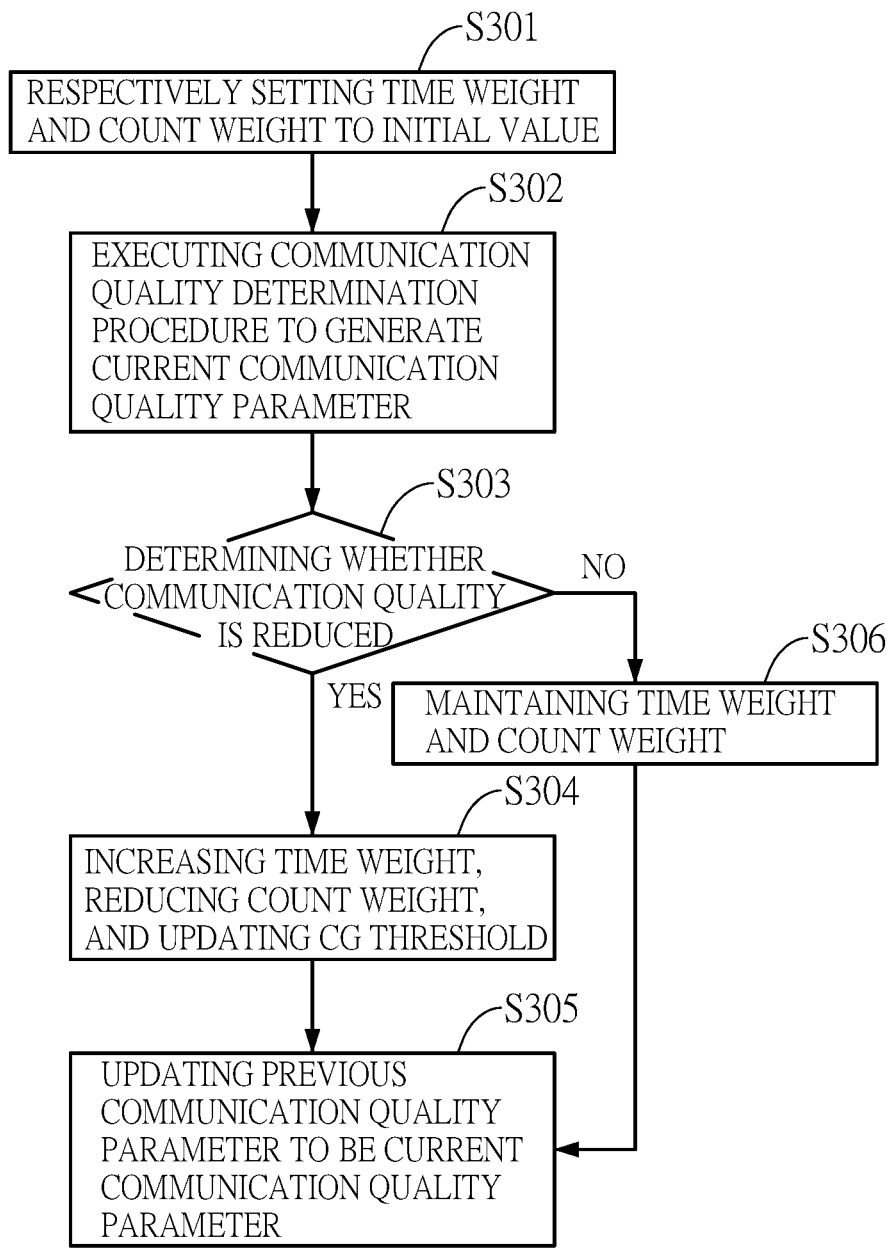
FIG. 3 is a schematic flowchart of a communication quality determination procedure of the method for dynamically switching transmission modes to increase reliability in UCEs of the present disclosure.

With reference to FIG. 3, the method for dynamically switching transmission modes in UCEs further includes step S301 to step S306.

In steps S301, the UE 10 respectively sets the time weight a1 and the count weight b1 to an initial value and presets a previous communication quality parameter.

In step S302, the UE 10 executes a communication quality determination procedure to generate a current communication quality parameter.

In step S303, the UE 10 determines whether communication quality is reduced according to the previous communication quality parameter and the current communication quality parameter for adjusting the time weight a1 and the count weight b1. In the embodiment, a sum of the time weight a1 and the count weight b1 is 1.

In step S304, when the communication quality is reduced, the UE 10 increases the time weight a1 and reduces the count weight b1.

In step S305, the UE 10 updates the previous communication quality parameter to be the current communication quality parameter.

In step S306, when the communication quality is not reduced, the UE 10 maintains the time weight a1 and the count weight b1, and updates the previous communication quality parameter to be the current communication quality parameter (S305).

The UE 10 can determine the communication quality of the radio channels becoming better or worse according to the communication quality determination procedure. Then, the UE 10 can dynamically adjust the time weight a1 and the count weight b1 according to the communication quality. Namely, the CG weight is calculated corresponding to the communication quality. When the communication quality is changed, the time weight a1 and the count weight b1 are correspondingly changed. Further, the UE 10 can calculate the CG weight only based on the time weight a1 or the count weight b1. Namely, the UE 10 can set the time weight a1 to be one, and set the count weight b1 to be zero. Or the UE can set the time weight a1 to be zero, and set the count weight b1 to be one.

For example, the initial value of the time weight a1 is 0.5, and the initial value of the count weight b1 is 0.5. Namely, a1=0.5, b1=0.5, $TH_1$=0.5, timer_max=200 ms, counter_max=10. Further, the timing value of the CG timer 11 is 100 ms, and the count value of the CG counter 12 is three. When the UE 10 receives the DG signal from the gNB 20, the UE 10 calculates the CG weight according to the following formula:

$$W_1 = a1 \times timer1 + b1 \times counter1 = 0.5 \times 100/200 + 0.5 \times 3/10 = 0.4$$

Since 0.4<0.7, the CG weight is smaller than the CG threshold. Therefore, the UE 10 transmits retransmission data to the gNB 20, and then the UE 10 further transmits a third new data the gNB 20.

After a while, the UE 10 executes a communication quality determination procedure to determine whether the communication quality of the radio channels is reduced. When the communication quality of the radio channels is reduced, the UE 10 increases the time weight a1, reduces the count weight b1, and further updates the CG threshold.

For example, after the UE 10 increases the time weight a1 and reduces the count weight b1, the time weight a1 is 0.7, the count weight b1 is 0.3, and the CG threshold $TH_1$ is 0.7. Further, timer_max=200 ms, counter_max=10. At this time, the timing value of the CG timer 11 is 180 ms, and the count value of the CG counter 12 is three. When the UE 10 receives the DG signal from the gNB 20, the UE 10 calculates the CG weight according to the following formula:

$$W1 = a1 \times timer1 + b1 \times counter1 = 0.7 \times 180/200 + 0.3 \times 3/10 = 0.72$$

Since 0.72≥0.7, the CG weight is greater than the CG threshold. Therefore, the UE 10 switches to the second CG transmission mode. When the communication quality is reduced, it means that the communication quality is easy to change. Therefore, the UE 10 increases the time weight a1 and reduces the count weight b1. Thereby, the influence of the timing value of the CG timer 11 can be increased by increasing the time weight a1 when the UE 10 calculates the CG weight.

In the embodiment, the communication quality determination procedure is executed periodically.

In another embodiment, the communication quality determination procedure is executed when the UE 10 switches to the second CG transmission mode.

In addition, the UE 10 can also execute the communication quality determination procedure in real time according to the communication quality for updating the time weight a1, the count weight b1, and the CG threshold $TH_1$ in real time.

The UE 10 can determine whether the communication quality is reduced by measuring the signal strength of communication signals. For example, the previous communication quality parameter is a strength value of a first communication signal received at the beginning. The current communication quality parameter is a strength value of a communication signal received when the communication quality determination procedure is executed. If the previous communication quality parameter is greater than or equal to the current communication quality parameter, it means that the signal strength of the communication signals is reduced, so that the UE 10 can determine that the communication quality is reduced.

Furthermore, the UE 10 may also measure an error rate, a failure rate, or a retransmission rate of transmitting the new data to the gNB 20 to determine whether the communication quality is reduced. For example, when the error rate, the failure rate, or the retransmission rate becomes higher, the UE 10 determines that the communication quality is reduced.

Moreover, the UE 10 can determine whether the communication quality is reduced by measuring the delay time of transmitting the new data to the gNB 20. For example, when the delay time becomes longer, the UE 10 determines that the communication quality is reduced.

Alternatively, the UE 10 can determine whether the communication quality is reduced by measuring a switching frequency of switching the CG transmission modes. For example, when the switching frequency becomes higher, the UE 10 determines that the communication quality is reduced. In summary, the UE 10 can count the number of UE failed transmission, such as UE LBT failures, or a number of gNB failed reception by the CG counter 12.

Thereby, the communication quality of the radio channels can be determined, the UE 10 can increase reliability by switching to the second CG transmission mode for improving a utilization rate of resources and getting better performance.

Even though numerous characteristics and advantages of the present disclosure have been set forth in the foregoing description, together with details of the structure and features of the disclosure, the disclosure is illustrative only. Changes may be made in the details, especially in matters of shape, size, and arrangement of parts within the principles of the disclosure to the full extent indicated by the broad general meaning of the terms in which the appended claims are expressed.

What is claimed is:

1. A method for dynamically switching transmission modes in unlicensed spectrum control environments (UCEs), executed by a user equipment (UE); wherein the UE performs a first configured grant (CG) transmission mode, and the method comprises steps of:
    transmitting a new data to a next generation Node B (gNB);
    determining whether a dynamic grant (DG) signal transmitted by the gNB is received;
    when the DG signal is received, starting a CG timer, increasing a count value of a CG counter, resetting a successful transmission count value of a successful transmission counter, calculating a CG weight according to a timing value of the CG timer and the count value, and determining whether the CG weight is greater than or equal to a CG threshold;
    when the CG weight is greater than or equal to the CG threshold, switching from the first CG transmission mode to a second CG transmission mode;
    when the CG weight is smaller than the CG threshold, transmitting a retransmission data to the gNB;
    wherein the CG weight is calculated by the following formula:

$W_1 = a1 \times timer1 + b1 \times counter1;$ $timer1 = timer\_current/timer\_max;$ $counter1 = counter\_current/counter\_max;$ wherein $W_1$ is the CG weight, a1 is a time weight, b1 is a count weight, timer_current is the timing value, timer_max is a preset maximum of waiting time, counter_current is the count value, counter_max is a maximum number of preset allowable failures, and a1+b1=1;
    wherein the CG threshold is calculated by the following formula:

$TH_1 = MAX[a1, b1];$ wherein $TH_1$ is the CG threshold.

2. The method for dynamically switching the transmission modes in the UCEs as claimed in claim 1, further comprising steps of:
    when the DG signal is not received, resetting the CG counter, and increasing the successful transmission count value, and determining whether the successful transmission count value is greater than or equal to a successful transmission threshold;
    when the successful transmission count value is greater than or equal to the successful transmission threshold, resetting the timing value of the CG timer and the successful transmission count value of the successful transmission counter, and transmitting a next new data to the gNB; and
    when the successful transmission count value is smaller than the successful transmission threshold, transmitting the next new data to the gNB.

3. The method for dynamically switching the transmission modes in the UCEs as claimed in claim 1, further comprising steps of:
    respectively setting the time weight a1 and the count weight b1 to an initial value, and presetting a previous communication quality parameter;
    executing a communication quality determination procedure to generate a current communication quality parameter, and determining whether communication quality is reduced according to the previous communication quality parameter and the current communication quality parameter for adjusting the time weight a1 and the count weight b1; wherein a sum of the time weight a1 and the count weight b1 is 1;
    when the communication quality is reduced, increasing the time weight a1, reducing the count weight b1, and updating the previous communication quality parameter to be the current communication quality parameter;
    when the communication quality is not reduced, maintaining the time weight a1 and the count weight b1, and updating the previous communication quality parameter to be the current communication quality parameter.

4. The method for dynamically switching the transmission modes in the UCEs as claimed in claim 3, wherein the communication quality determination procedure is executed periodically.

5. The method for dynamically switching the transmission modes in the UCEs as claimed in claim 3, wherein the communication quality determination procedure is executed when the UE switches to perform the second CG transmission mode.

6. A system for dynamically switching transmission modes in unlicensed spectrum control environments (UCEs), comprising:
    a user equipment (UE), communicatively connected to a next generation Node B (gNB), and performing a first configured grant (CG) transmission mode; wherein the UE is configured to:
    transmit a new data to the gNB, and determine whether a dynamic grant (DG) signal transmitted by the gNB is received;
    when the DG signal is received, start a CG timer, increase a count value of a CG counter, reset a successful transmission count value of a successful transmission counter, calculate a CG weight according to a timing value of the CG timer and the count value, and determine whether the CG weight is greater than or equal to a CG threshold;
    when the CG weight is greater than or equal to the CG threshold, switch from the first CG transmission mode to a second CG transmission mode;
    when the CG weight is smaller than the CG threshold, transmit a retransmission data to the gNB;
    wherein the CG weight is calculated by the following formula:

$W_1 = a1 \times timer1 + b1 \times counter1;$ $timer1 = timer\_current/timer\_max;$ $counter1 = counter\_current/counter\_max;$ wherein $W_1$ is the CG weight, a1 is a time weight, b1 is a count weight, timer_current is the timing value, timer_max is a preset maximum of waiting time, counter_current is the count value, counter_max is a maximum number of preset allowable failures, and a1+b1=1;
    wherein the CG threshold is calculated by the following formula:

$TH_1 = MAX[a1, b1];$ wherein $TH_1$ is the CG threshold.

7. The system for dynamically switching the transmission modes in the UCEs as claimed in claim 6, wherein when the DG signal is not received, the UE resets the CG counter, and increases the successful transmission count value, and determines whether the successful transmission count value is greater than or equal to a successful transmission threshold;

wherein when the successful transmission count value is greater than or equal to the successful transmission threshold, the UE resets the timing value of the CG timer and the successful transmission count value of the successful transmission counter, and transmits a next new data to the gNB;

wherein when the successful transmission count value is smaller than the successful transmission threshold, the UE transmits the next new data to the gNB.

8. The system for dynamically switching the transmission modes in the UCEs as claimed in claim 6, wherein the UE respectively sets the time weight a1 and the count weight b1 to an initial value, and presets a previous communication quality parameter;

wherein the UE executes a communication quality determination procedure to generate a current communication quality parameter, and determines whether communication quality is reduced according to the previous communication quality parameter and the current communication quality parameter for adjusting the time weight a1 and the count weight b1; wherein a sum of the time weight a1 and the count weight b1 is 1;

wherein when the communication quality is reduced, the UE increases the time weight a1, reduces the count weight b1, and updates the previous communication quality parameter to be the current communication quality parameter;

wherein when the communication quality is not reduced, the UE maintains the time weight a1 and the count weight b1, and updates the previous communication quality parameter to be the current communication quality parameter.

9. The system for dynamically switching the transmission modes in the UCEs as claimed in claim 8, wherein the communication quality determination procedure is executed periodically.

10. The system for dynamically switching the transmission modes in the UCEs as claimed in claim 8, wherein the communication quality determination procedure is executed when the UE switches to the second CG transmission mode.

* * * * *